United States Patent
Montevirgen et al.

(10) Patent No.: US 9,398,637 B2
(45) Date of Patent: Jul. 19, 2016

(54) HOTSPOT DEVICE

(71) Applicant: Apple Inc., Cupertino, CA (US)

(72) Inventors: Anthony S. Montevirgen, San Francisco, CA (US); David G. Havskjold, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 68 days.

(21) Appl. No.: 14/086,381

(22) Filed: Nov. 21, 2013

(65) Prior Publication Data

US 2015/0141083 A1    May 21, 2015

(51) Int. Cl.
*H04W 88/04* (2009.01)
*H04M 1/02* (2006.01)

(52) U.S. Cl.
CPC ............ *H04W 88/04* (2013.01); *H04M 1/0208* (2013.01); *H04M 1/0243* (2013.01)

(58) Field of Classification Search
CPC ... H04W 84/045; H04W 88/08; G06F 1/1677
See application file for complete search history.

(56) References Cited

U.S. PATENT DOCUMENTS

| | | | | |
|---|---|---|---|---|
| 3,996,440 | A * | 12/1976 | Niconienko | 200/570 |
| 4,864,474 | A * | 9/1989 | Maglica | 362/203 |
| 6,735,450 | B1* | 5/2004 | Remmert | H04B 1/38 361/688 |
| 2004/0140967 | A1* | 7/2004 | Kojo | 345/204 |
| 2007/0072442 | A1* | 3/2007 | DiFonzo et al. | 439/39 |
| 2010/0209752 | A1* | 8/2010 | Lerner et al. | 429/97 |
| 2010/0220700 | A1* | 9/2010 | Hodroj et al. | 370/338 |
| 2012/0274541 | A1* | 11/2012 | Inami et al. | 345/1.3 |

* cited by examiner

*Primary Examiner* — Khalid Shaheed
*Assistant Examiner* — Ernest Tacsik
(74) *Attorney, Agent, or Firm* — Brownstein Hyatt Farber Schreck, LLP

(57) ABSTRACT

Embodiments disclosed herein relate generally to a compact device for providing Wi-Fi connectivity for an electronic device. The compact device is rotatably activated and includes interchangeable batteries and indicia indicating activation.

20 Claims, 12 Drawing Sheets

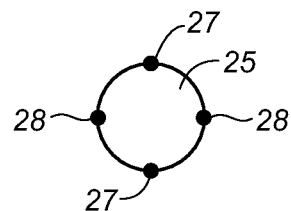
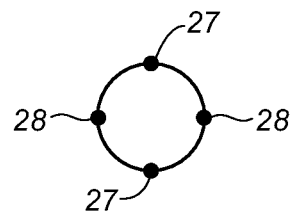
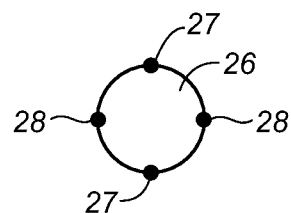
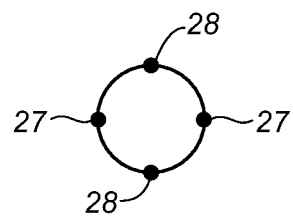
FIG. 5     FIG. 6
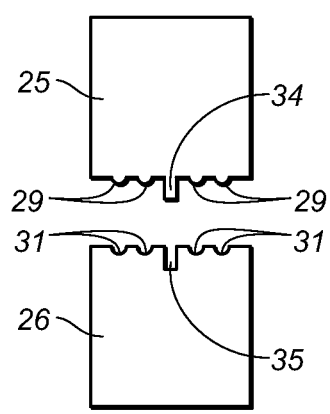
FIG. 7
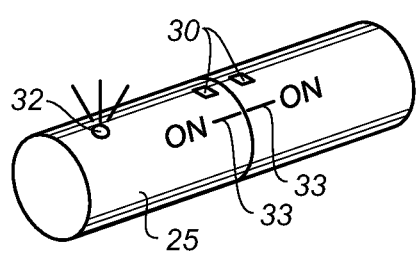
FIG. 8

HOTSPOT DEVICE

TECHNICAL FIELD

Embodiments disclosed herein relate generally to devices for enabling internet connectivity through a cellular network.

BACKGROUND

A hotspot is a site that offers Internet access over a wireless local area network (WLAN) through the use of a wireless router connected to an internet service provider. Hotspots typically use Wi-Fi technology. Hotspots are often found at restaurants, train stations, airports, libraries, hotels, hospitals, coffee shops, bookstores, fuel stations, department stores, supermarkets, RV parks and campgrounds, public pay phones, and other public places. Many universities and schools have wireless networks on their campus. These establishments having wireless routers can turn off their authentication requirements, thus opening their connection, intentionally or not, for sharing by anyone in range. The public can then use a laptop or other suitable portable device to access the wireless connection.

Closed public networks use a hotspot management system to control the hotspot. This software runs on the router itself or an external computer. With this software, operators can authorize only specific users to access the Internet, and they often limit the free access. Operators are also now able to limit each user's available bandwidth—each user is therefore restricted to a certain speed to ensure that everyone gets a good quality service. Often this is done through service-level agreements. Other hotspot providers charge a fee to users in order to provide internet access through the hotspot.

Roaming services are expanding among major hotspot service providers. With roaming service the users of a commercial provider can have access to other provider's hotspots with extra fees, in which such a user will usually be charged on the basis of access-per-minute. Hotspots may be provided by retail establishments as an incentive for users to frequent their stores. For example, coffee shops offer free internet connections over Wi-Fi networks. These connections, while free, suffer from limitations such as security and privacy. These networks also suffer from signal limitations such that a user must be within range of the signal to access the connection. Sheer volume of traffic due to many users may also slow down the transfer of information and make the connection less than optimal.

Many Wi-Fi adapters built into or easily added to consumer computers include the functionality to operate as hotspots. Some third-party software vendors offer applications to allow users to operate their own hotspot, whether to share an existing connection or extend the range of another hotspot. Other methods provide for a user to join a Wi-Fi subscriber service. The intention is to provide better bandwidth and services-on-demand to end-users, while also alleviating traffic overloads of mobile carrier infrastructure.

Security is a serious concern in connection with hotspots. In particular the wireless connection between the client and the access point is often encrypted to prevent the connection from being compromised. A hotspot gateway is a device that provides authentication, authorization and accounting for a wireless network. This can keep malicious users off of a private network even in the event that they are able to break the encryption. A wireless hotspot gateway helps solve guest user connectivity problems by offering instant Internet access without the need for configuration changes to the client computer or any resident client-side software. Thus the user can still get access to the network with their existing network configuration.

Existing wireless hotspot devices are limited in their usefulness in that, while more convenient and secure than public hotspot access, they may not be convenient to operate and carry. These devices include external control which may accidentally be activated by a user. It would be useful therefor to have a device which minimizes inadvertent activation. In addition, hotspot gateways should be convenient to carry and have a conveniently available power supply.

SUMMARY

The invention is a cellular hotspot device. In one embodiment the invention is a cylindrical device with no external controls. The device includes two cylindrical portions which may be rotated to activate the device. The electronics, antenna, and power supply are contained within the device. The cylindrical portions may be separated to access the internal components. The power supply is included in one of the cylindrical portions and may be interchangeable with power supplies of different capacities.

In another embodiment, the invention is a cellular hotspot device in the form of a card-like configuration. The structure includes removable portions in the interior of the card which may contain the power supply, electronics and the antenna. Other configurations for the hotspot device may be included in alternate embodiments which will allow for convenient transport and ease of use.

BRIEF DESCRIPTION OF THE FIGURES

FIG. 5 is a side sectional view along the lines 5-5 of FIG. 3 of a hotspot gateway illustrating the electrical detents in activation configuration;

FIG. 6 is a side sectional view along the lines 5-5 of FIG. 3 illustrating the electrical detents in deactivation configuration;

FIG. 7 is a side view illustrating the interaction of the detents in the first and second portions of the hotspot device;

FIG. 8 is a perspective view of a hotspot gateway device illustrating indicia to signal the status of the device;

DETAILED DESCRIPTION

Figure 1:
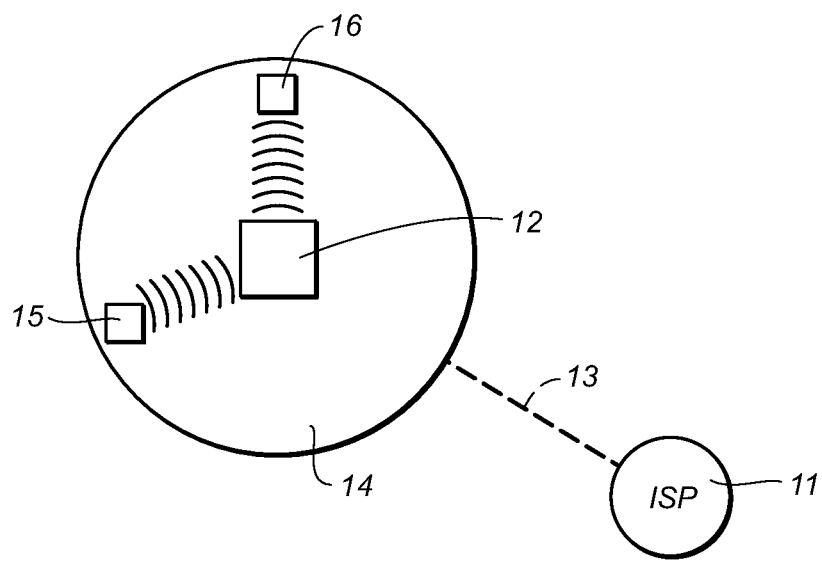
In FIG. 1 is a schematic illustrating a conventional Wi-Fi network.

Referring now to the figures wherein like reference numerals denote like elements, FIG. 1 illustrates a conventional Wi-Fi network which includes an internet service provider (ISP) 11 connected to wireless router 12 through a conventional Ethernet wired connection 13. Wireless router 12 may be located, for example, in a retail establishment and have a desired signal range generally illustrated by circle 14. The strength of the signal from router 12 determines its signal range 14. This signal range is controlled by the retail establishment to maximize user traffic on the user premises. These signal providers customarily generate a signal strength from router 12 such that users remain within the confines of the establishment providing the signal. The retail establishment, or airport, or other party provides this access as a convenience to its customers as a courtesy and to attract such users to its premises. A user computer or other electronic device 15 which is located within this range and which is capable of connecting to a wireless network may access ISP 11 through router 12. Similarly, an additional multiplicity of users such as second electronic device 16 may access ISP 11 through router 12.

One of the disadvantages of the system shown in FIG. 1 is that the privacy of communications through wireless router 12 may be limited. A multiplicity of members of the public may access this network merely by having a presence inside the signal range 14 of router 12 as is shown by users 15 and 16. Another disadvantage of the network shown in FIG. 1 is that the connection through router 12 may be slow due to a large number of users or due to the quality of the connection and the router or other equipment provided in that network. Some establishments, such as hotels offer such a network access at a price in order to limit the number of users and to limit the use to approved users (i.e. hotel guests). In this system the hotel provides a password to its guests either free or for a price. In this way, the network provider has some control over additional or unwanted users such as hackers accessing the network undetected.

The use of a wireless capability such as shown by users 15 and 16 in FIG. 1 may have certain disadvantages in that the user must remain in a possibly chaotic environment in some retail establishments such as coffee shops etc. to remain within signal range 14. A user may wish to choose a quieter and more private venue as opposed to a crowded and less secure one. In addition, the user may achieve a greater degree of physical privacy in that she may not have another individual "looking over her shoulder" while she is using her computer or other device. Thus, such a public system continues to suffer from the drawbacks of network privacy and possibly network overload resulting in poorer performance of her device.

Figure 2:
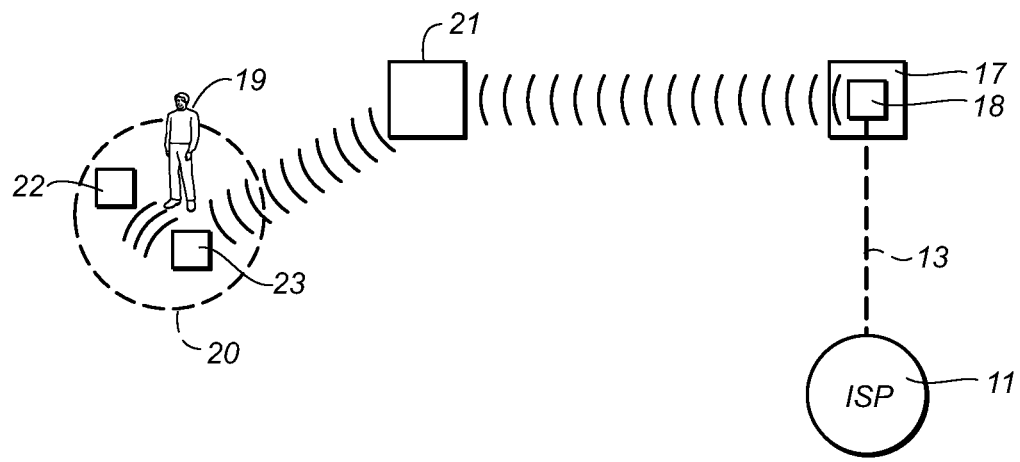
FIG. 2 is a schematic of a Wi-Fi network using a hotspot gateway.

Referring to FIG. 2, a network is shown in which internet service provider 11 is connected through Ethernet or other known physical connections to the premises 17 which may be a home or other suitable location as chosen by a user 19. A wireless router 18 contained within premises 17, with access to router 18 being controlled by user 19, may be wirelessly connected though wireless network carrier 21 to the user computer 22 through a wireless device 23. Wireless device 23 may be a cellular phone of a user or another mobile device which functions as a mobile wireless router to effectively connect user device 22 with internet service provider 11 through the wireless router 18 located on the premises 17. With this system configuration, access and the signal range 20 of the wireless device 23 is controlled by the user such that the location at which the user accesses ISP 11 is chosen by the user. In addition, by controlling signal range 20, the user can limit access to the immediate area surrounding her.

The system described in FIG. 2 is often referred to as tethering. Tethering refers to connecting one device 22 to another 23 to allow for internet access of the connected device 22. In the context of mobile phones or Internet tablets, tethering allows sharing the Internet connection of, for example, phone 23 with other devices such as laptop or tablet 22. Connection of the phone other devices 23 with the user device 22 can be done over wireless LAN (Wi-Fi), over Bluetooth or by physical connection using a cable, for example through a USB port. If tethering is done over Wi-Fi, the device 23 to which the tethered device 22 is connected may be referred to as a mobile hotspot or gateway device. The Internet-connected mobile device 23 can thus act as a portable wireless access point for devices connected to it.

The system shown in FIG. 2 may provide a greater degree of privacy to user device 22 and may also provide a higher level of performance than connecting to the ISP 11 though the public Wi-Fi network shown in FIG. 1. The mobile hotspot device 23 shown in FIG. 2 used for tethering may be a mobile telephone such as an iPhone or other suitable mobile device. While mobile telephones have become more compact and easier to carry in recent years, there are times when it is not convenient or otherwise desirable to carry such devices. For example, when a user is engaged in physical activities such as jogging or otherwise exercising, or is engaged in an outdoors activity such as hiking or camping, it is not always convenient or desirable to carry multiple electronic devices.

While it may not be desirable or convenient to carry multiple electronic devices, there may still be a need or desire to connect to the internet through an ISP as illustrated in FIG. 2. In order to overcome the disadvantages associated with carrying multiple sophisticated devices, it is possible to obtain devices which are commonly known as mobile hotspot devices. These devices are small portable devices which may readily be carried on the person of a user, such as for example, in the pocket or attached to a keychain of the user.

There are disadvantages with use of conventional mobile hotspot devices. Chief among the disadvantages is inadvertently activating or deactivating the devices and the relative battery lifetime of such devices. Because the mobile hotspot devices are small and may be used in situations where the user is engaged in strenuous physical activities such as hiking or jogging, inadvertent activation of the mobile hotspot device may occur. The device may be carried in a pocket or otherwise jostled thereby activating an on-off switch which is located on the exterior of the device.

Because of the small size of the mobile hotspot device, it is difficult to provide power to the device for long periods of time as the battery life tends to be proportional to the size of the battery. Because, by design, the mobile hotspot device is made small such that a user may carry it on a key chain or in a small area on the user's person, the battery tends to be small and have a relatively short life.

Figure 3:
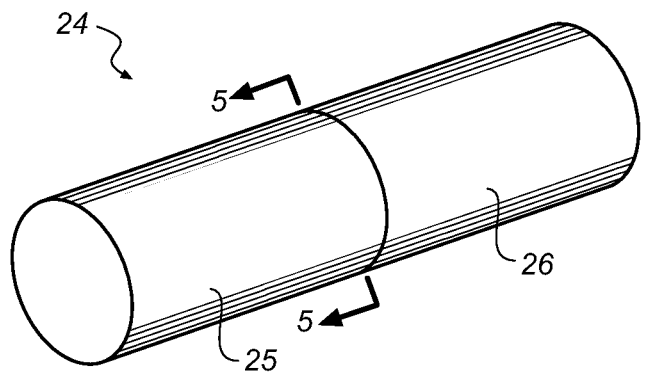
FIG. 3 is a perspective view of a hotspot gateway device.

Referring to FIG. 3, a mobile hotspot device in the form of a cylinder 24 is shown. Cylinder 24 includes a first half 25 and a second half 26. In one embodiment, first half 25 may contain the main logic board (MLB) and other electronics such as the Security Information Management (SIM) card. Second half 26 may contain the battery or power source (such as a 1000mAh battery)for the device. In order to prevent inadvertent activation of the device there are no external switches or buttons on the device which could be accidently moved to activate the device during ongoing activities of the user.

Figure 4:
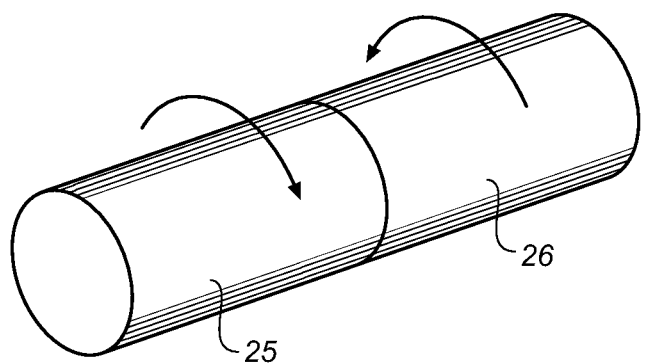
FIG. 4 is a perspective view of a hotspot gateway device illustrating the rotational operation of the device.

Referring to FIG. 4, mobile hotspot device may be activated or deactivated by rotating first half 25 and second half 26 in opposite directions as shown. Of course, the rotation arrows are for illustration purposes only and first half 25 and second half 26 could be rotated in opposite directions to the arrows shown so long as they are rotated opposite to each other. Referring to FIG. 5, which is a sectional view of first half 25 and second half 26 taken along line 3-3 of FIG. 3, the ends of first half 25 and second half 26 are shown where they engage one another along sectional line 3-3. Electrical detents 27 are shown in FIG. 5 in alignment such that the electrical detents 27 on first half 25 and the electrical detents on second half 26 are in electrical contact when in this configuration and power from a battery contained in second half 26 may be supplied to MLB and other electronics contained in first half 25. Insulating detents 28 are also shown in alignment in FIG. 5 and serve to help align first half 25 and second half 26.

Referring to FIG. 6, electrical detents 27 are shown out of phase such that, when in this configuration, there is no power supplied by battery in second half 26 to the MLB or other electronics contained within first half 25. That is, electrical detents 27 are engaged with insulating detents 28 and no electrical connection is made. The relative positions of electrical detents 27 in FIGS. 5 and 6 is achieved by rotating first half 25 and second half 26 with respect to one another as shown in FIG. 4. That is, rotation of first half 25 with respect to second half 26 by approximately one quarter turn will align electrical detents 27 in first half 25 with those of second half 26 and will align insulating detents 28 in first half 25 with insulating detents 28 in second half 26. Similarly, once engaged, rotation of first half 25 with respect to second half 26 in the opposite direction will disengage electrical detents 27 in first half 25 with those of second half 26 and engage electrical detents 27 in first half with insulating detents 28 in second half and vice versa such as the configuration shown in FIG. 6. In this configuration, electrical detents 27 engage with insulating detents 28 in first and second portions 25 and 26 such that electromagnetic connection of power source in second half 26 with MLB and other electronics in first half 25 is broken and the device 24 is turned off. In an alternate embodiment, insulating detents are eliminated and electromagnetic detents 27 do not engage with any other detents in the "off" position. Air pockets or other nonconductive materials could be provided in place of insulating detents such that electrical detents 27 in first half 25 do not receive electric current from power source in second half 26.

As can be appreciated, the location and number of detents 27 and 28 is merely one of design choice and could be modified without departing from the preferred embodiments. For example, the location of detents on the periphery of first half 25 and second half 26 could be such that rotation of more or less than one-quarter turn of first half with respect to second half is needed to align electrical detents 27 in first half 25 with electrical detents 27 in second half 26 and thus align electrical detents 27 in first half with insulating detents 28 in second half to turn the device off.

By using the rotation of first half 25 with respect to second half 26 to align detents 27 and 28 to activate the device, the possibility of inadvertent or accidental activation of the device is reduced. While a button or switch located on the exterior of cylinder 24 may be highly susceptible to such inadvertent activation, the rotation activation of one embodiment of the invention substantially reduces this risk. In one embodiment the physical configuration of electrical detents 27 and insulting detents 28 contributes to this improved reliability.

Referring to FIG. 7, a side sectional view of first half 25 and second half 26 is shown taken along the same sectional line 3-3 as in FIGS. 5 and 6. Electrical detents 27 and insulating detents 28 are shown as protrusions 29 in first half 25 and as depressions 31 in second half 26. By using this configuration for detents 27 a positive engagement between first half 25 and second half 26 may be achieved. That is, when first half and second half are rotated with respect to one another into the engagement position of FIG. 5, Protrusions 29 on first half 25 fit into depressions 31 on second half 26. Protrusions 29 may be spring loaded to allow for retraction during rotation of first portion 25 and second portion 26. When protrusions 29 are engaged with depressions 31 a greater degree of force is required to rotate first half 25 with respect to second half 26 to activate or deactivate the device. Thus the possibility of inadvertent activation/deactivation is thereby reduced. A removable connection device 34 and 35 is also shown and will be described in more detail below.

Referring to FIG. 8, a perspective view of cylinder 24 is shown in the device activation position of FIG. 5. That is, electrical detents 27 in first portion 25 and second portion 26 are engaged with one another. One or more external indicators 32 is shown indicating that first half 25 and second half 26 are in the activation position illustrated in FIG. 5. External indicator 32 may take the form of an indicator light such as a light emitting diode (LED) which is lit when the device is "on" and unlit when the device is "off". In another embodiment, indicator 32 could be markings 33 on the exterior of first half 25 and second half 26 such that when the marks are aligned as illustrated in FIG. 8, the user knows that the device is "on" and when the marks are not aligned the user may know that the device is off. Alternatively, "off" markings could also be supplied. In yet another embodiment, magnetic sensors 30 on first portion 25 and second portion 26 may be provided to detect rotation of first portion 25 with respect to second portion 26.

Figure 9:
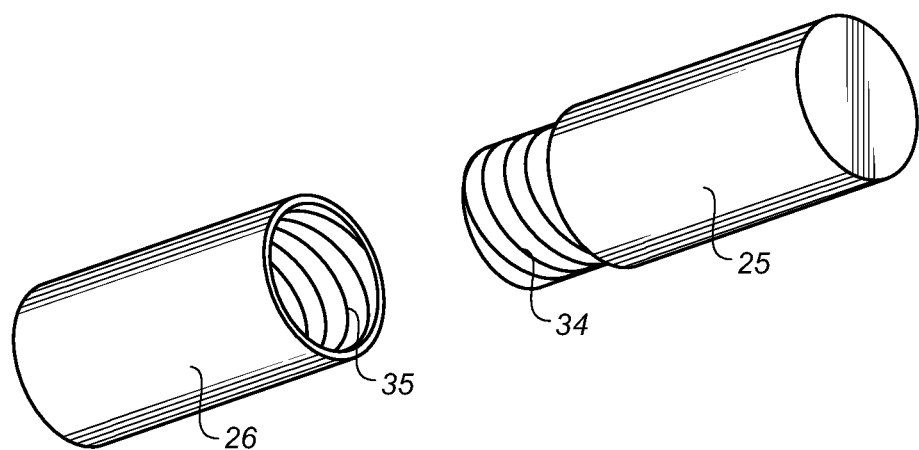
FIG. 9 is a perspective view of a hotspot gateway device illustrating the removable connection between first and second portions of the device.
Figure 10:
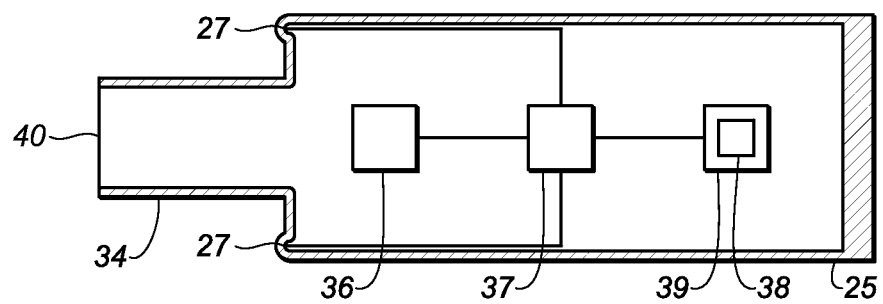
FIG. 10 is a side sectional view of the device illustrating the electronic components in a first portion of the device.

Referring to FIG. 9, in another embodiment first half 25 and second half 26 are separated along sectional line 3-3 of FIG. 3. A male threaded portion 34 on first half 25 and a female threaded portion 35 on second half 26 are illustrated. In this embodiment, first half 25 and second half 26 may be separated by rotating (unscrewing) first half 25 from second half 26. In this embodiment, the electronics contained in first half may be accessed through the opening inside threaded portion 34. For example, referring to FIG. 10 a security information management (SIM) card 36 may be accessed by a user through opening 40 in threaded portion 34. By allowing access the SIM card 36 may be replaced or accessed for other reasons. Similarly, the main logic board (MLB) 37 or other electronics may be accessed in first half 25. An antenna 38 is enclosed in plastic housing 39 or otherwise insulated from metal body of first portion 25. Alternatively, first portion housing 25 could be made of plastic or other suitable material so as not to interfere with wireless radio signals received by antenna 38. The embodiment shown in FIG. 10 allows ease of repair or replacement of electronic components of the device.

Figure 11:
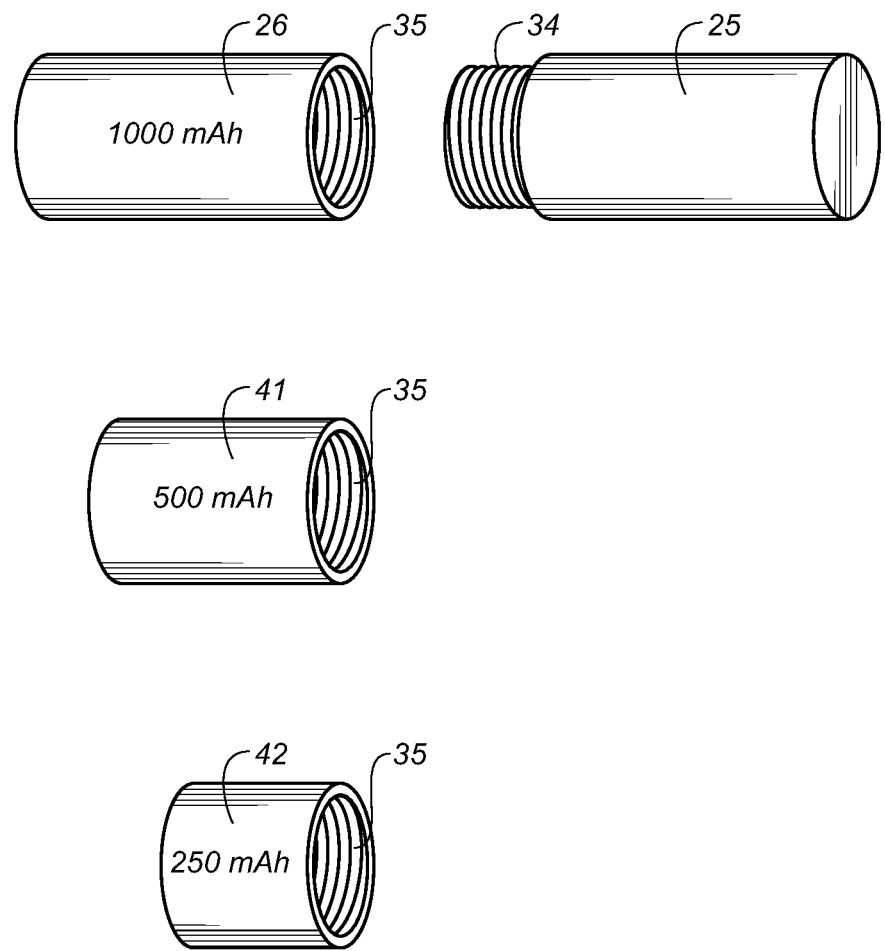
FIG. 11 is a perspective view of a hotspot gateway device illustrating alternate battery configurations.

Referring to FIG. 11, in another embodiment, alternate power sources may be utilized. For example, batteries 41 and 42 may be used in place of the battery contained in second half 26. Batteries 41 and 42 may be of a different power level than the battery contained in second half 26 as shown. This allows a user to choose the level of battery life and power desired and to control the size and weight of the device 24. For example, a battery 42 of 250 milli-amps per hour (250 mAh) such as that shown may be substituted for the 1000 mAh battery 26 shown in FIG. 3. Another battery 41 may supply 500 mAh. Each of batteries 41 and 42 include female threaded portion 35 such that they are easily engaged with threaded portion 34 on first portion 25 of device 24. Batteries 26, 41, and 42 are thus interchangeable. The relative size and weight of each of batteries 26, 41, and 42 can be evaluated by a user depending upon her needs and weighed against the life and strength of the power supplied by each. Thus the device 24 may have a length that varies from about 2 inches to about 4 inches depending upon the battery selected. Of course, the actual size and weight are merely one of design choice and may vary from one embodiment to another.

Figure 12:
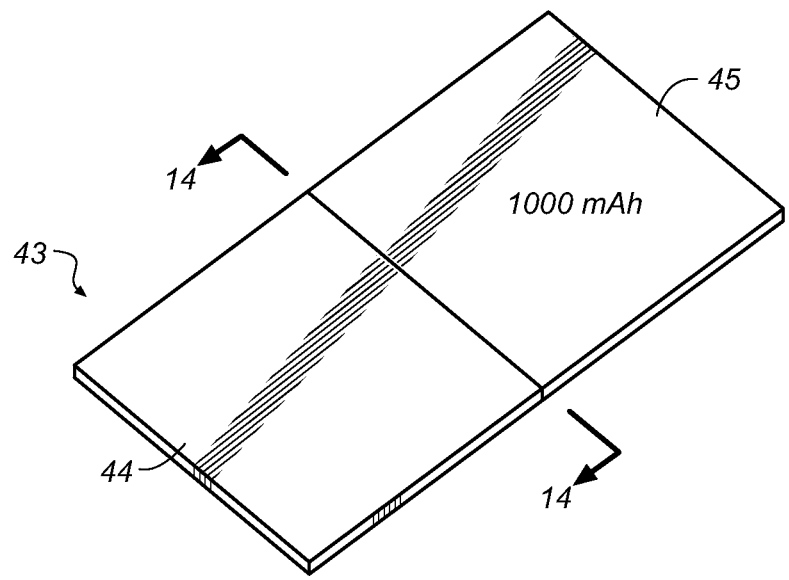
FIG. 12 is a perspective view of a hotspot gateway device in accordance with an alternate embodiment.

Referring to FIG. 12, in another embodiment, a card-like device 43 may function as a mobile hotspot device. Card 43 includes a first portion 44 and a second portion 45. In one embodiment, first portion 44 may contain the main logic board (MLB) and other electronics such as the Security Information Management (SIM) card. Second portion 45 may contain the battery or power source for the device. In order to prevent inadvertent activation of the device there are no external switches or buttons on the device which could be accidently moved to activate the device during ongoing activities of the user.

Figure 13:
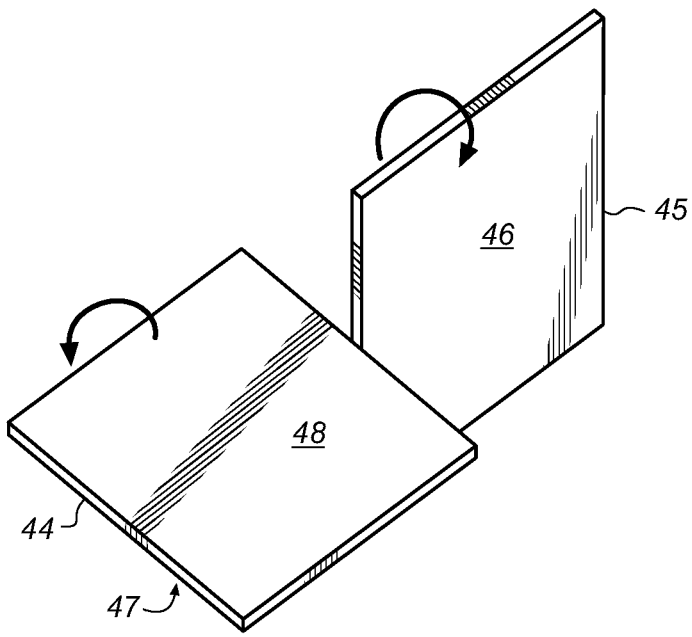
FIG. 13 is a perspective view of a hotspot gateway device in accordance with an alternate embodiment illustrating the rotational operation of the device.

Referring to FIG. 13, mobile hotspot device may be activated or deactivated by rotating first half 44 and second half 45 in opposite directions. In this embodiment, first portion 44 and second portion 45 are rotated one half turn such that a first side 46 of second portion 45 is coplanar with a second side 47 (not visible) of first half 44 when in one mode and first side 46 is coplanar with first side 48 of first portion 44 in another mode.

Figure 14:
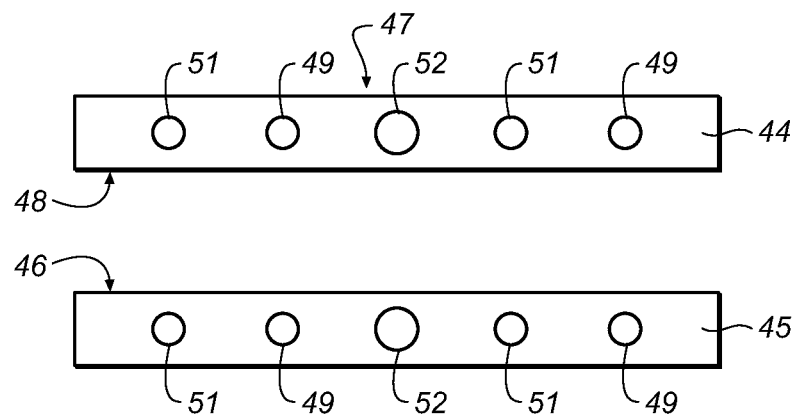
FIG. 14 is a side sectional view taken along the lines 14-14 of FIG. 12 illustrating the electrical detents in activation configuration in an alternate embodiment.

Referring to FIG. 14, which is a sectional view of first portion 44 and second portion 45 taken along line 14-14 of FIG. 12, the ends of first portion 44 and second portion 45 are shown where they engage one another along sectional line 14-14. Electrical detents 49 are shown in FIG. 14 in alignment such that the electrical detents 49 on first half 44 and the electrical detents 49 on second half 45 are in electrical contact when in this configuration and power from a battery contained in second half 45 may be supplied to MLB and other electronics contained in first half 44. Insulating detents 51 are also shown in alignment in FIG. 14 and serve to align first half 44 and second half 45. This activation mode occurs when first side 46 of second portion 45 and second side 47 of first portion 44 are aligned. Removable attachment portion 52 is shown and allows connection of first portion 44 and second portion 45 as will be discussed below.

Figure 15:
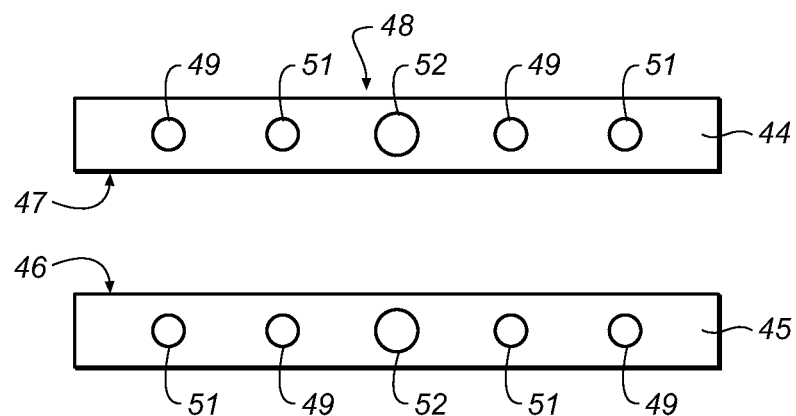
FIG. 15 is a side sectional view taken along the line 14-14 of FIG. 12 illustrating the electrical detents in deactivation configuration in an alternate embodiment.

Referring to FIG. 15, electrical detents 49 are shown out of phase such that, when in this configuration, there is no power supplied by battery in second half 45 to the MLB or other electronics contained within first half 44. The relative positions of electrical detents 49 in FIG. 15 is achieved by rotating first half 44 and second half 45 with respect to one another as shown and described with respect to FIG. 13. That is, rotation of first half 44 with respect to second half 45 by approximately one hundred eighty degrees in either direction from the position shown in FIG. 14 such that first side 46 of second portion 45 is coplanar with first side 48 of first portion 44. In this position electrical detents 49 in first half 44 will disengage with electric detents 49 of second half 45 and engage electrical detents 49 in first and second portions 44 and 45 with insulating detents 51 in the other portion 44 and 45 such as the configuration shown in FIG. 15. In this configuration, electrical detents 49 engage with insulating detents 51 such that electromagnetic connection of power source in second half 45 with MLB and other electronics in first half 44 is broken and the device is turned off.

As can be appreciated, and as with the cylindrical embodiment described above, the location of detents 49 and 51 is merely one of design choice and could be modified. For example, the location of detents shown as evenly spaced on the edge of first half 44 and second half 45 could be changed such that the detents are spaced closer to or further from the edge. As long as detents 49 and 51 align as described above when first 44 and second 45 halves are aligned, the actual position of detents 49 and 51 on the edge of first and second portions 44 and 45 are irrelevant to the function of the device.

By using the rotation of first portion 44 of card 43 with respect to second potion 45 to align detents 49 and 51 and activate or deactivate the device, the possibility of inadvertent or accidental activation of the device is reduced. While a button or switch located on the exterior of card 43 may be highly susceptible to such inadvertent activation, the rotation activation of first half 44 and second half 45 in one embodiment substantially reduces this risk. In one embodiment the physical configuration of electrical detents 49 and insulting detents 51 contributes to this improved reliability.

Figure 16:
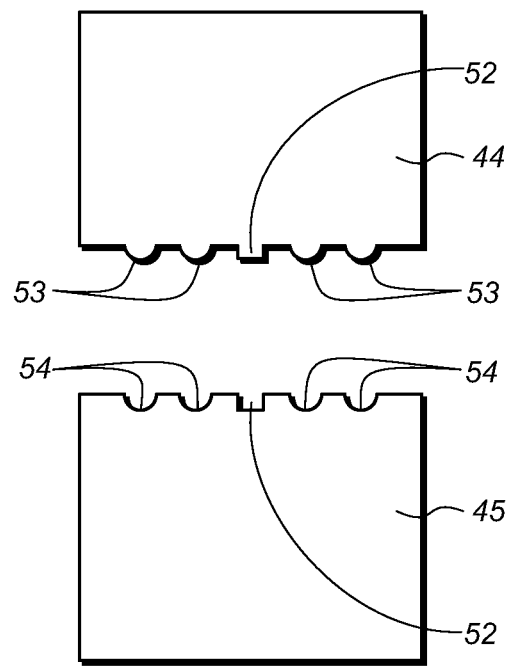
FIG. 16 is a side view illustrating the interaction of the detents in the first and second portions of the hotspot device in an alternate embodiment.

Referring to FIG. 16, a side view of first half 44 and second half 45 is shown taken along the same sectional line 12-12 as in FIGS. 14, and 15. Electrical detents 49 and insulating detents 51 are shown as protrusions 53 in first half 44 and as depressions 54 in second half 45. By using this configuration for detents 49 and 51 a positive engagement between first half 44 and second half 45 may be achieved. That is, when first half and second half are rotated with respect to one another into the engagement position of FIGS. 14 and 15, protrusions 53 on first half 44 fit into depressions 54 on second half 45 such that a greater degree of force is required to rotate first half 44 with respect to second half 45 to activate or deactivate the device. The possibility of inadvertent activation or deactivation is thereby reduced. Protrusions 53 may be spring loaded to allow for movement as needed during rotation of first portion 44 and second portion 45. A removable connection device 52 is also shown and will be described in more detail below.

Figure 17:
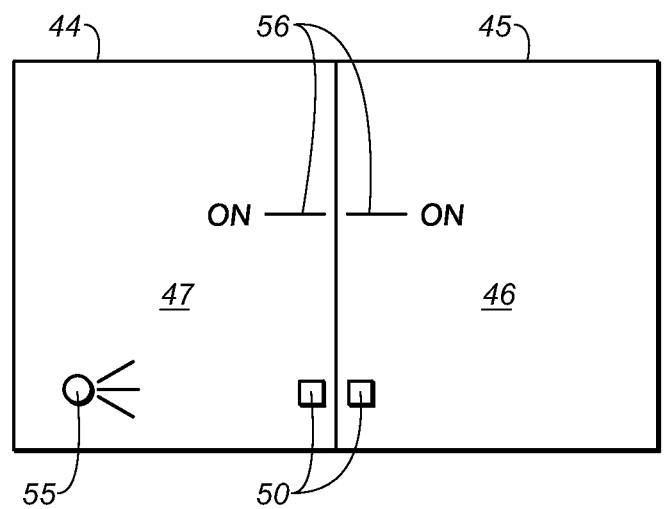
FIG. 17 is top view of an alternate embodiment of the invention illustrating the indicia to signal the status of the device.

Referring to FIG. 17, a perspective view of card 43 is shown in the device activation position of FIG. 14. That is, side 46 of second portion 45 and side 47 of first portion 44 are aligned in the position shown in FIG. 14 such that electrical detents 49 in first portion 44 and second portion 45 are in electrical contact and power is supplied to first portion 44. In this position, one or more external indicators 55 is shown indicating that first half 44 and second half 45 are in the activation position illustrated in FIG. 14. External indicator 55 may take the form of an indicator light such as a light emitting diode (LED) which is lit when the device is "on" and unlit when the device is "off". In another embodiment, indicator could be external indicia markings 56 on the exterior of first half 44 and second half 45 such that when the marks are aligned as illustrated in FIG. 17, the user knows that the device is "on" and when the marks are not aligned the user may know that the device is off. In another embodiment, first half 44 and second half 45 could be color coded such that side 46 of second portion 45 and side 47 of first portion 44 are, for example, a first color. The other side 47 of each of first half 44 and the opposite side (not shown) of second half 45 are a second different color. When the user sees the colors on first half 44 and second half 45 match each other such that each side of card 43 is a uniform color, she knows that the device is "on". When the colors on first half 44 and second half 45 are not the same then the device is turned "off". Of course, the choice of colors and choice of color alignment are arbitrary such that matching colors could indicate that the device is turned "off". In yet another embodiment, magnetic sensors 50 on first portion 44 and second portion 45 may be provided to detect rotation of first portion 44 with respect to second portion 45.

Figure 18:
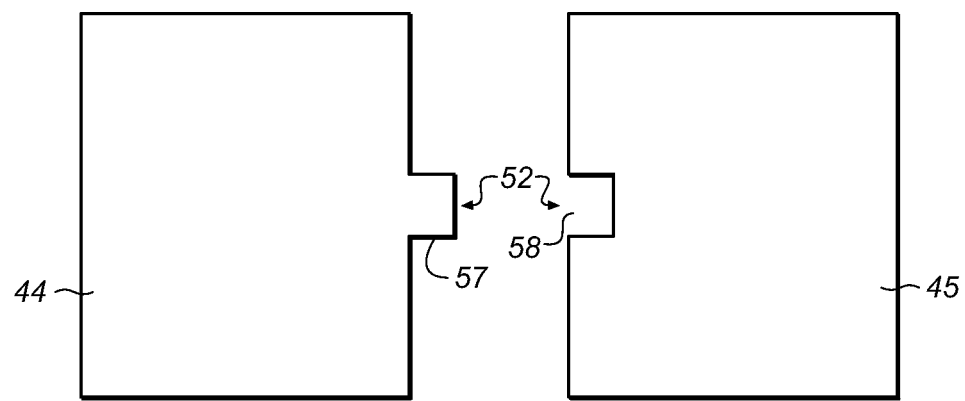
FIG. 18 is top view of an alternate embodiment illustrating the removable connection between first and second portions of the device.

Referring to FIG. 18, in another embodiment first half 44 and second half 45 are separated along sectional line 12-12 of FIG. 12. A removable attachment portion 52 is shown. A male portion 57 on first half 44 and a female portion 58 on second half 45 are illustrated. In this embodiment, first half 44 and second half 45 may be separated by disengaging male portion 57 from female portion 58. Male portion 57 and female portion 58 may be mating members of a rotatable hinge, threaded portion or other known device such that male portion 57 may be rotated with respect to, and detached from, female portion 58 by a user. Separation of first portion 44 from second portion 45 may be accomplished when desired as will be discussed below.

Figure 19:
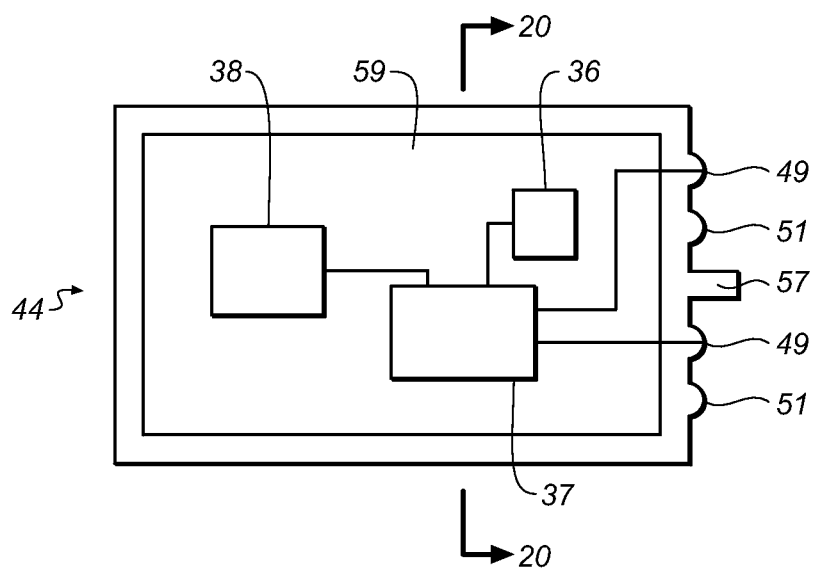
FIG. 19 is a top view of an alternate embodiment illustrating the electronic components in a first portion of the device.

Referring to FIG. 19 a security information management (SIM) card 36 may be accessed by a user by removing a cover layer (not shown) to access a recessed portion 59 in the interior of card 44. By allowing access the SIM card 36 may be replaced or accessed for other reasons. Similarly, the main logic board (MLB) 37 or other electronics may be accessed in first half 44. MLB 37 is electrically connected to electrical detents 49 in first portion 44. An antenna 38 may be enclosed in plastic or otherwise insulated from metal body of first portion 44. Alternatively, first portion 44 could be made of plastic or other suitable material so as not to interfere with wireless radio signals received by antenna 38. The embodiment shown in FIG. 19 allows ease of repair or replacement of electronic components of the device.

Figure 20:
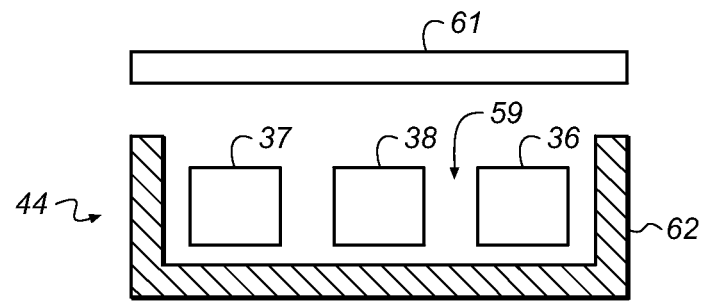
FIG. 20 is a side sectional view along the line 20-20 in FIG. 19 illustrating the electronic components in a first portion of the device.

Referring to FIG. 20, in this embodiment, the electronics contained in first half are shown in a side sectional view of first half 44 taken along line 20-20 of FIG. 19. For example, a security information management (SIM) card 36 may be accessed by a user. By allowing access the SIM card 36 may be replaced or accessed for other reasons. Similarly, the main logic board (MLB) 37 or other electronics may be accessed in recessed portion 59 of first portion 44. Access to these components in first half 39 may be made by separating a removable top portion 61 from lower portion 62 of first portion 44. This embodiment allows ease of repair or replacement of electronic components of the device.

Figure 21:
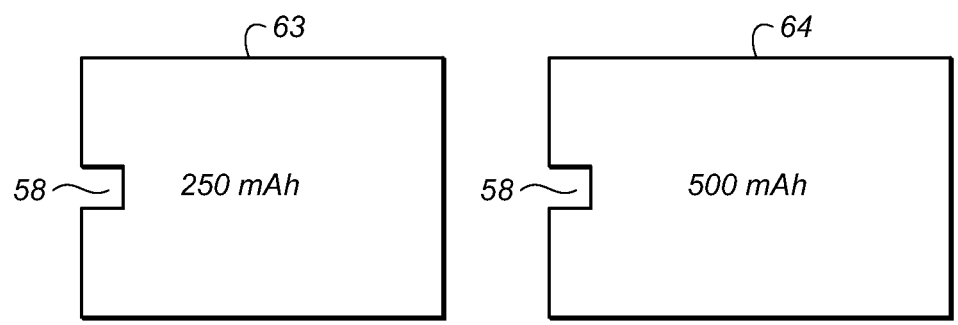
FIG. 21 is a top view of an alternate embodiment illustrating alternate battery configurations.

Referring to FIG. 21, in another embodiment, alternate power sources may be utilized. For example, batteries 63 or 64 may be used in place of the battery contained in second half 45. Batteries 63 and 64 may be of a different power level than the battery contained in second half 45. This allows a user to choose the level of battery life and power desired in the card device 43. For example, a battery 63 of 250 milli-amps per hour (250 mAh) such as that shown may be substituted for the 1000 mAh battery shown in FIG. 12. Another battery 64 may supply 500 mAh. Each of batteries 63 and 64 include female portion 58 such that they are easily engaged with male portion 57 on first portion 44 of device 43. The relative size and weight of each of batteries 44, 63, and 64 can be evaluated by a user depending upon her needs and weighed against the life and strength of the power supplied by each. Thus the device 43 may have a size which varies from about the size of a credit card to one larger or smaller depending upon the desire of a user. Of course the actual size and weight are merely one of design choice.

Figure 22:
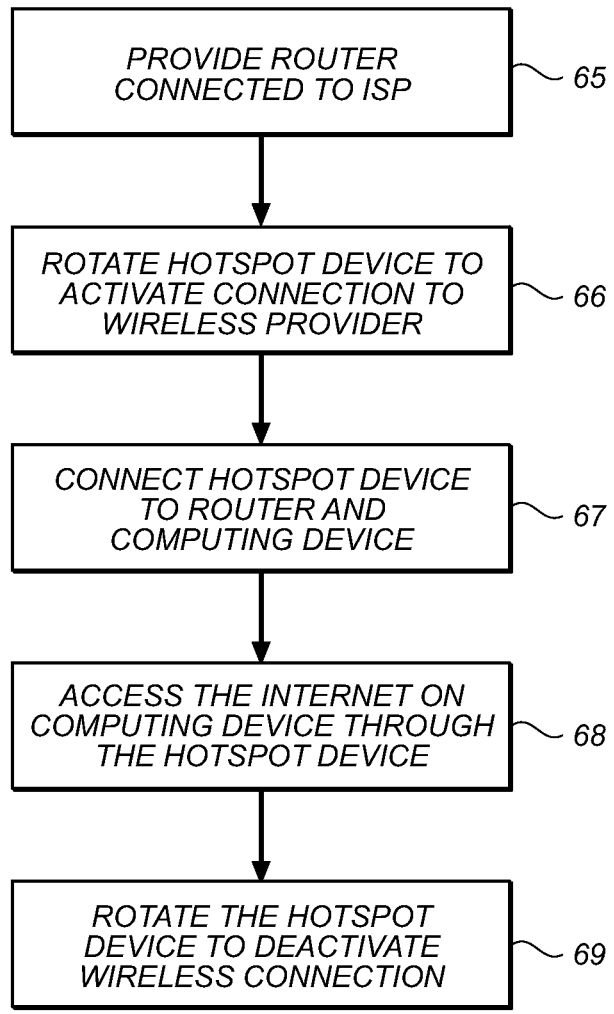
FIG. 22 is a flow chart illustrating the method for connecting a computing device and an internet service provider.

Referring to FIG. 22, a flow chart of the method for connecting a computing device and an internet service provider is illustrated. Referring to FIG. 21, in step 65 a router 18 is connected to an internet service provider by means of an Ethernet connection 13 or other suitable connection. A hotspot gateway, which may be a hotspot device 23, is activated by rotating a portion of the device with respect to a second portion of the device in step 66 to provide a wireless connection between hotspot device 23 and the computing device 22 and between the hotspot device 23 and the router 18 through wireless provider 21. By activating the hotspot device, in step 67, the hotspot device wirelessly connects the computing device 22 to the router 18 through a wireless provider 21. The computing device 22 is then effectively connected to the internet service provider 11 and a user 19 may thus access the internet on the computing device 22 in step 68. When the user desires to terminate the wireless connection of the hotspot 23 (and the computing device 22) to the router 18, she may again rotate the hotspot device portions to deactivate the wireless connection.

While the disclosure has described various embodiments, it should be expressly understood to those of ordinary skill in the art that certain modifications may be made without departing from the spirit or scope of this disclosure. For example, while various configurations have been disclosed for electrical and insulating detents, various other placements of the detents would function without departing from the spirit or scope of the disclosure. While the cylindrical and card configurations of the hotspot device have been disclosed, other configurations such as, for example, cubes, spherical, or rectangular configurations that have a first portion and a second portion which are rotatable with respect to each other may be employed without departing from the spirit or scope of the disclosure. Accordingly, the proper scope of this disclosure is set forth in the following claims.

The invention claimed is:

1. A portable wireless access device for communicating with a portable computing device comprising:
    a first housing portion including:
        a main logic board;
        an antenna electrically connected to the main logic board;
        a security information management card electrically connected to the main logic board;
        a first contact coupled to the main logic board;
    a second housing portion rotatably coupled to the first housing and including:
        a power source; and
        a second contact coupled to the power source; wherein:
            the second housing portion is configured to rotate between a deactivated position and an activated position;
            in the activated position, the first and second contacts are aligned and the power source and the main logic board are electrically connected; and in the deactivated position the first and second contacts are misaligned and the power source is disconnected from the main logic board.

2. The portable wireless access device according to claim 1 wherein the first housing portion includes a first cylindrical portion and the second housing portion includes a second cylindrical portion removably connected to the first housing portion.

3. The portable wireless access device according to claim 1 wherein the first housing portion includes a first side and a second side and the second housing portion includes a first side and a second side coplanar with the first side and the second side of the first portion, the second housing portion removably connected to the first housing portion.

4. The portable wireless access device according to claim 1 wherein the power source includes a battery.

5. The portable wireless access device according to claim 1 wherein the first housing portion includes indicia electrically connected to the main logic board indicating that the power source is connected to the main logic board.

6. The portable wireless access device according to claim 1 wherein the first and second housing portions include visual indicia on the external surface of the first and second housing portions that cooperatively indicate that the power source is connected to the main logic board.

7. The portable wireless access device according to claim 1 further including:
the first contact includes first electromagnetic detents;
the second contact includes second electromagnetic detents engageable with the first electromagnetic detents; and
whereby an electromagnetic connection is made between the power source and the main logic board when the first electromagnetic detents are engaged with the second electromagnetic detents.

8. The portable wireless access device according to claim 7 further including:
the first portion including first insulating detents engageable with the second electromagnetic detents;
the second portion including second insulating detents engageable with the first electromagnetic detents; and
whereby an electromagnetic connection is broken between the power source and the main logic board when the first electromagnetic detents are engaged with the second insulating detents and the first insulating detents are engaged with the second electromagnetic detents.

9. The portable wireless access device according to claim 1 wherein the first housing portion and the second housing portion include magnetic sensors for detecting rotation of the first housing portion with respect to the second housing portion.

10. A system for use in a wireless communication network comprising:
a computing device;
a portable hotspot device connectible to the computing device, the portable hotspot device including:
a first housing portion, including:
a main logic board;
an antenna electrically connected to the main logic board;
a security information management card electrically connected to the main logic board; and
a second housing portion rotatably coupled to the first housing portion and including:
a power source; and wherein
the second housing portion is configured to rotate between a deactivated position and an activated position;
when in the deactivated position, a first detent mechanism inhibits rotation between the first housing portion and the second housing portion; and
when in the activated position, a second detent mechanism inhibits rotation between the first housing portion and the second housing portion and the power source is electrically connected to the main logic board.

11. The system according to claim 10 wherein the first housing portion includes a first cylindrical portion and the second housing portion includes a second cylindrical portion removably connected to the first housing portion.

12. The system according to claim 10 wherein the first housing portion includes a first side and a second side and the second housing portion includes a first side and a second side coplanar with the first side and second side of the first housing portion, the second housing portion removably connected to the first housing portion.

13. The system according to claim 10 wherein the second housing portion includes a battery.

14. The system according to claim 10 wherein the first housing portion includes indicia electrically connected to the main logic board indicating that power is provided to the main logic board.

15. The system according to claim 10 wherein the first and second housing portions include visual indicia on the external surface of the first and second housing portions that cooperatively indicate that the power source is connected to the main logic board.

16. The system according to claim 10 wherein:
the second detent mechanism includes a first electromagnetic detent engageable with a second electromagnetic detent; and
an electrical connection is broken between the power source and the main logic board when the first electromagnetic detent is disengaged with the second electromagnetic detent.

17. A method for connecting a computing device and an internet service provider comprising the steps of:
electrically connecting a wireless router to the internet service provider and to a wireless service provider;
electrically connecting a portable wireless hotspot device to the router including the steps of:
rotating a first housing portion of the portable wireless hotspot device with respect to a second housing portion of the portable wireless hotspot device from a deactivated position to an activated position such that electrical contacts on the first housing portion align with electrical contacts on the second housing portion in the activated position, the first housing portion including a main logic board and the second housing portion including a power source;
providing power from the power source to the main logic board in the activated position;
receiving an electromagnetic signal from the wireless service provider at the portable wireless hotspot device;
electrically connecting the computing device to the portable wireless hotspot device; and
whereby the computing device is electrically connected to the internet service provider through the portable wireless hotspot device.

18. The method of claim 17 wherein the step of rotating includes engaging first electromagnetic detents on the first housing portion with second electromagnetic detents on the second housing portion in the activated position.

19. The method of claim 18 wherein the step of rotating further includes engaging the first electromagnetic detents on the first housing portion with a second set of insulating detents on the second housing portion and engaging a first set of insulating detents on the first housing portion with the second electromagnetic detents on the second housing portion in the deactivated position and whereby the electrical connection is broken between the power source and the main logic board in the deactivated position.

20. The method of claim 17 further including the step of rotating the first housing portion of the portable wireless hotspot device with respect to the second housing portion of the portable wireless hotspot device from an activated position to a deactivated position such that the power source and the main logic board are electrically disconnected.

\* \* \* \* \*